Patented Feb. 18, 1930

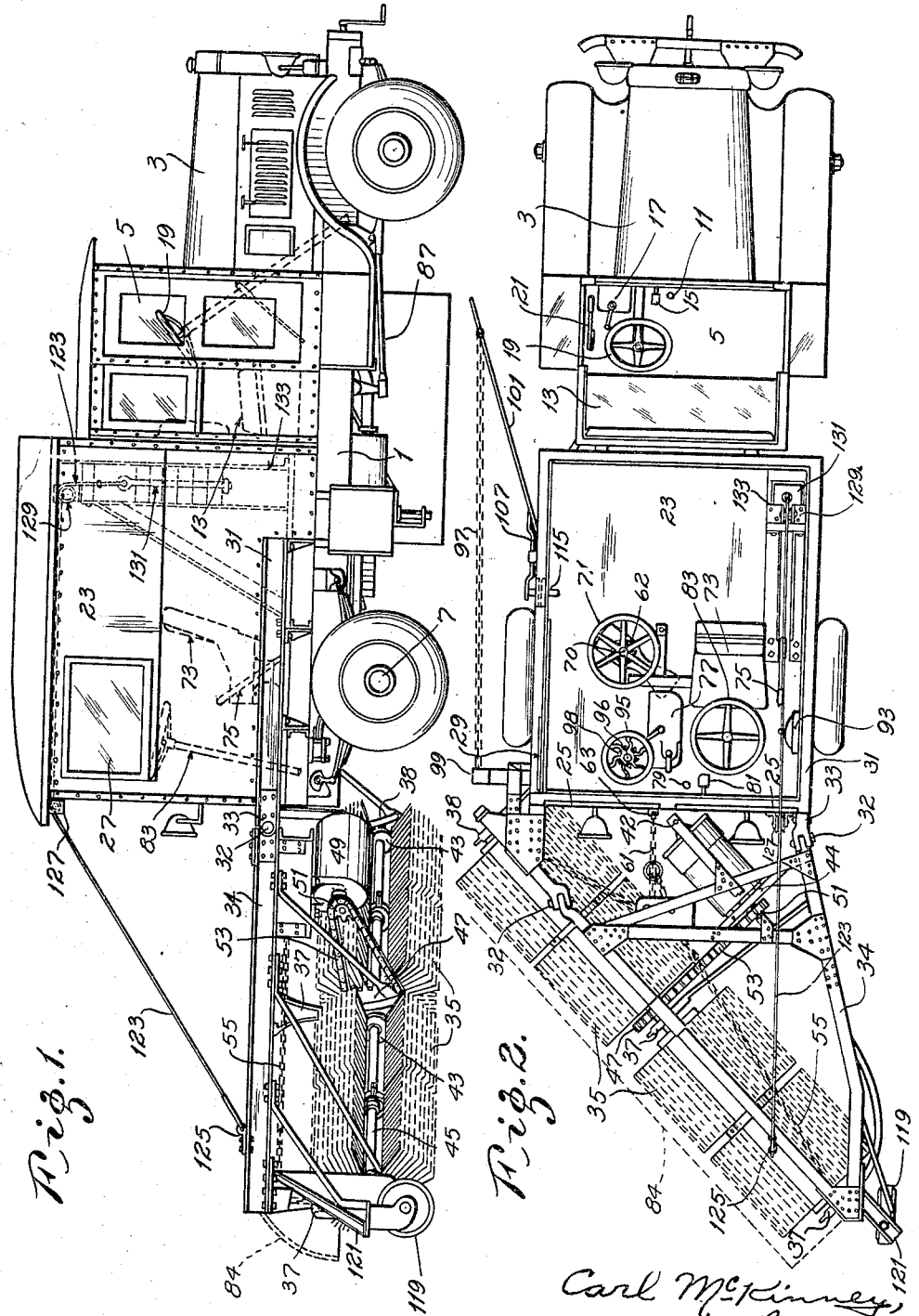

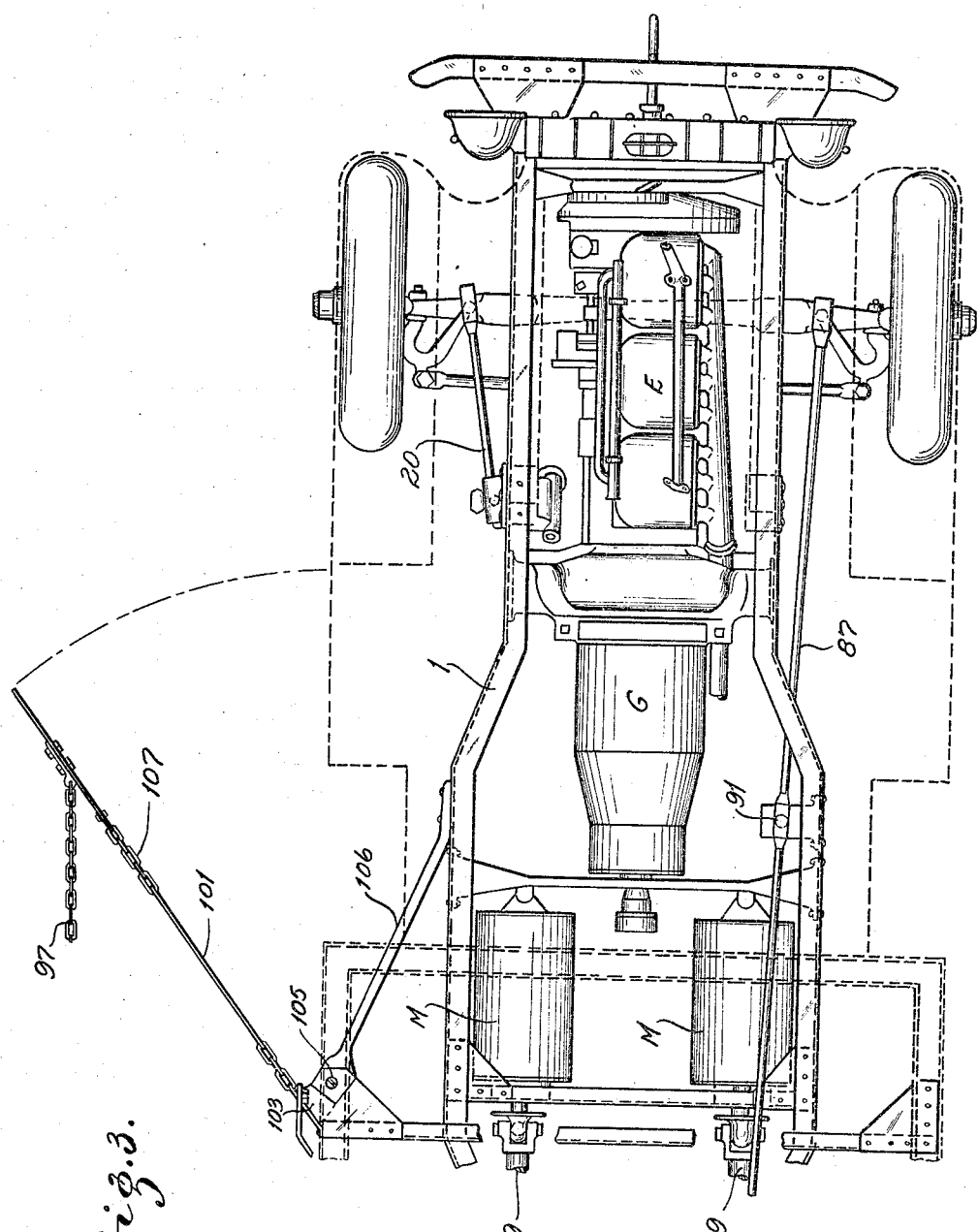

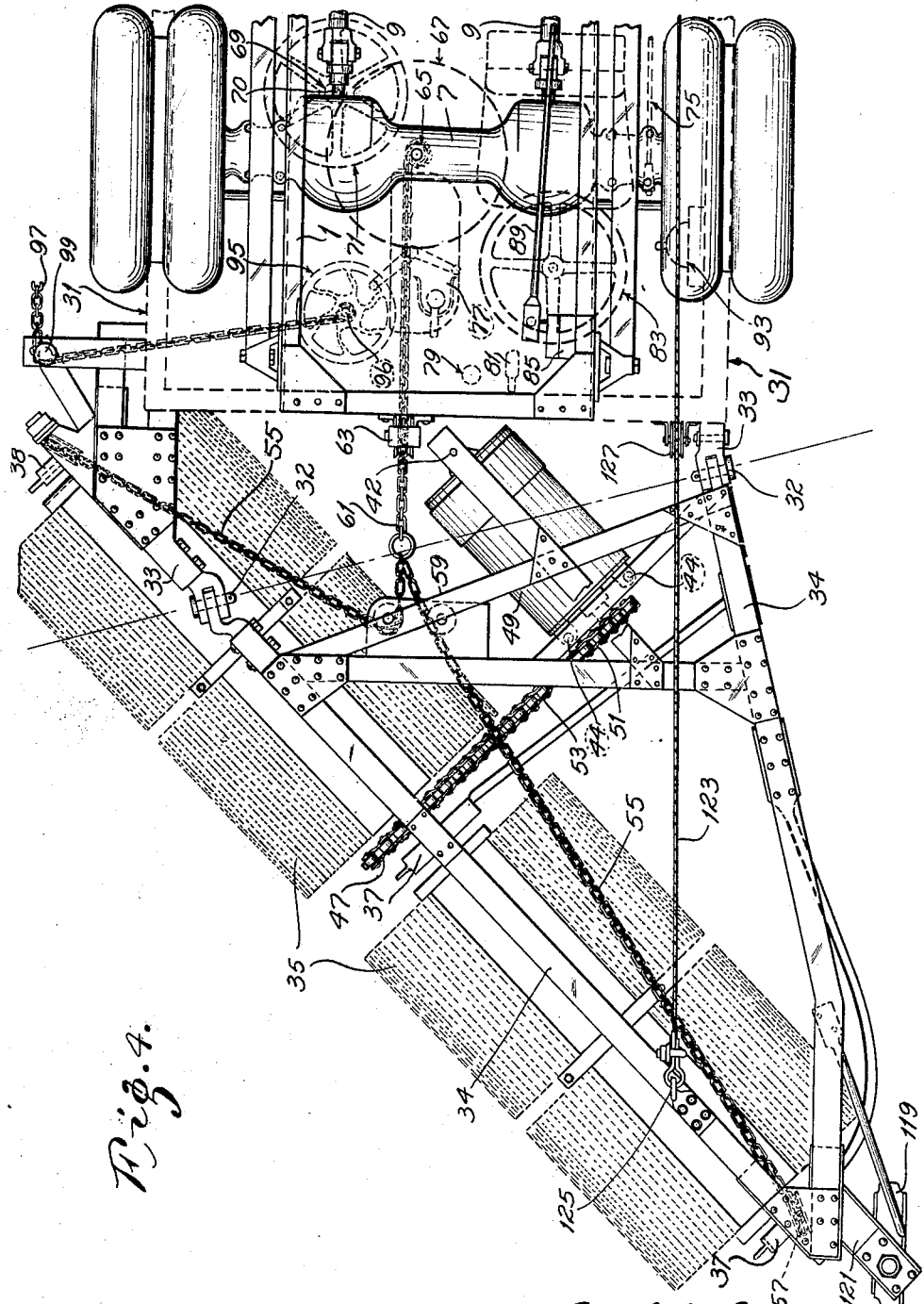

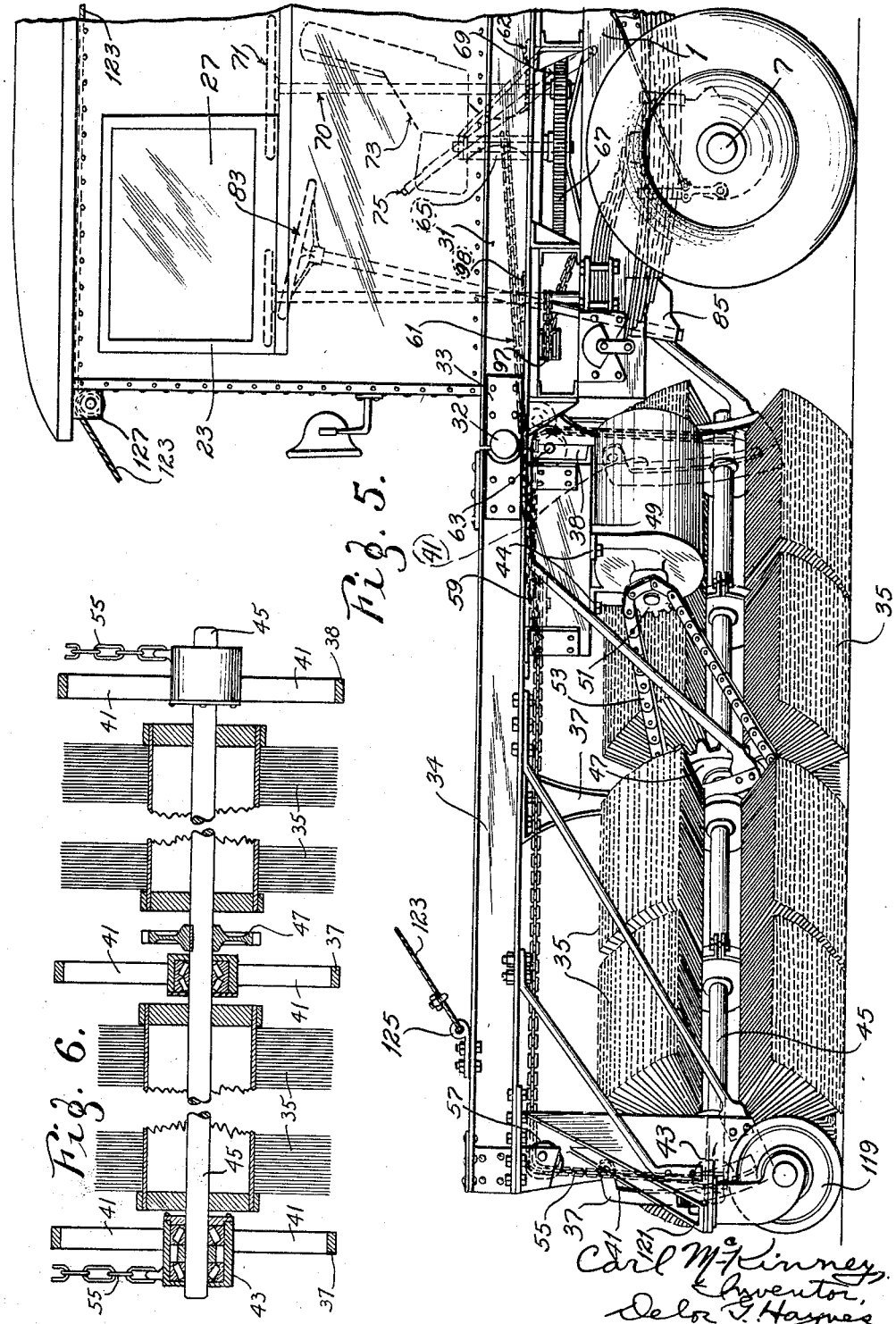

1,748,049

UNITED STATES PATENT OFFICE

CARL McKINNEY, OF PARIS, ILLINOIS, ASSIGNOR TO CUMMINGS CAR AND COACH COMPANY, OF PARIS, ILLINOIS, A CORPORATION OF ILLINOIS

SWEEPER

Application filed March 18, 1927, Serial No. 176,319. Renewed July 17, 1929.

This invention relates to sweepers, and with regard to certain more specific features, to gas-electric sweeping vehicles for cleaning highways and the like.

Among the several objects of the invention may be noted the provision of a gas-electric sweeping vehicle which is articulated in such a manner that the chassis accommodates itself to elevations and depressions in the roadway; the provision of a sweeping vehicle of the class described in which the sweeping elements always remain at or near the ground; and the provision of a sweeper of the class described which is rugged and economical of construction. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which is illustrated one of various possible embodiments of the invention, Fig. 1 is a side elevation of the sweeper;

Fig. 2 is a plan view of Fig. 1, parts being broken away;

Fig. 3 is a plan view of the forward portions of the sweeper, parts being broken away;

Fig. 4 is a plan view of the rear portions of the sweeper showing in detail the brush mounting, parts being broken away;

Fig. 5 is a side elevation of said rear portions; and,

Fig. 6 is a vertical longitudinal section taken through and illustrating a brush and its mountings.

Similar reference characters indicate corresponding parts throughout the several views of the drawings.

Referring now more particularly to Fig. 1, there is illustrated at numeral 1 a chassis of a gas-electric driven motor truck. Upon this chassis 1 is mounted the conventional hood 3 and a driver's cab 5 enclosing the usual auxiliary and like mechanisms found on trucks of this type.

A prime mover comprising preferably a gas engine E is mounted beneath the hood 3 (see also Fig. 3) which is adapted to drive an electric generator G, preferably direct connected therewith. The generator G provides electric current for the driving motors M, which are connected to the rear axle 7 of the truck by means of conventional drive systems 9.

For purposes of controlling the operation of the engine E there is provided an accelerator pedal 11. This pedal 11 is located in the cab 5 for the use of a driver, who is to be seated on a seat 13, also in said cab. The driver is also provided with a foot brake pedal 15 for operating the service brakes of the vehicle. In the present embodiment these brakes are pneumatically operable. The driver is also provided with a controller 17 which has, for example, three operating positions, namely, forward, reverse and off. This controller serves to make proper electrical connection between the generator G and the motors M, while the pedal 11 serves to control the speed of the vehicle after electrical driving connections have been made. The pedal 11 regulates the fuel feed to said engine E. A conventional steering gear 19, as well as an emergency brake lever 21 are also provided for the operator in the cab 5. The drag link 20 for the steering gear 19, is located at the left of the truck and is connected to the left-hand steering knuckle thereof.

The elements so far enumerated comprise those which are adapted to permit the ordinary forward and reverse movements of the truck.

Mounted rearwardly of the cab 5 is a sweeper cab 23. This cab, which comprises a box-like structure, has windows at the rear end at one side thereof. The rear windows are designated by numerals 25, while the side windows are designated by numerals 27. An entrance and exit door 29 is also provided.

The sweeper cab 23 is mounted on a framework 31 which extends rearwardly of the vehicle. This framework, the cab 23 and certain other elements to be described, are bolted as a unit to the rear of the chassis 1. This bolting is done from the framework 31. The framework 31 is suitably braced to the cab 23 and is rigidly connected therewith. This framework 31 includes short rearward extensions 33 to which is hinged a brush frame 34. The hinge pins are numbered 32 in the drawings and are in alignment. The frame 34 aids in supporting the motor-driven sweeper brush or broom 35. The construction for mounting the brush 35 comprises a plurality of depending members, two of which are numbered 37 in the drawings. These depending members or arms 37 are rigidly connected to the framework 34 and include arcuate portions or slots 41 which are adapted to receive therein slidable bearing blocks 43 which rotatably support a shaft 45 upon which the said brush 35 is mounted in suitable sections (see Fig. 6).

Another depending member or arm 38 is rigidly connected to the framework 31 on the chassis 1. This depending arm 38 also includes an arcuate portion or slot 41 (aligned with said slots 41 in the members 37). This last-named slot 41 is also adapted to receive therein another slidable bearing block 43 which aids in supporting said shaft 45.

The brush shaft 45 carries a sprocket 47 fastened thereto. This sprocket 47 is adapted to be driven from a motor 49 mounted on said frame 34. The motor 49 is provided with a driving sprocket 51. A chain 53 provides the driving connection between the sprockets 47 and 51. The motor 49 is pivoted at the point 42 so as to have some relative movement with respect to the frame 34 and may be adjusted in position with regard to its fastenings 44 on said hinged framework 34. This method of mounting provides means for taking up wear that may occur in the chain 53.

The arcuate slot portions 41 are formed with the describing centers of their arcs on a line which is substantially coincident with the center line of the motor 49. This means that the bearing blocks 43, which support the brush shaft 45, may be moved up and down with said shaft 45 without seriously changing the driving relationships between the sprockets 47, 51 and the chain 53. Hence the elevation of the broom 35 may be varied.

In order to adjust the elevation of the broom or brush 35, the outermost bearing blocks 43 have supporting chains 55 fastened thereto. These chains pass upwardly through pulley blocks 57, 59 (mounted on the framework 31) and are joined to a broom raising chain 61. The chain 61 passes in beneath the sweeper cab 23, through a guide pulley 63 and passes to a hoisting drum 65 comprising a vertically and rotatably supported shaft fastened to a horizontal gear 67. The gear 67 is meshed with a pinion 69 which is fastened to a shaft 70. The shaft 70 carries an elevated hand wheel 71 for controlling the winding and unwinding of the broom raising chain 61. The broom raising system is reversible. A positively acting pawl or catch 62 is provided with a suitable ratchet for preventing reversal at predetermined times. This pawl is manipulated by the operator's foot.

The hinged frame 34 is supported in a predetermined relationship with respect to the roadway by means of a caster or roller 119 which is fastened to the outer end of said frame 34 by means of a suitable strut 121. The caster 119 is adapted to swivel on said strut 121.

In order to remove most of the weight of the framework 34 (and attendant parts) from the caster 119, there is provided a cable 123 fastened at 125 (near the outer end of the frame 34) and running upwardly to a pulley block 127 and into said cab 23. Inside of the cab 23 the cable 123 runs to a second pulley block 129 and passes downwardly to a suitable counter-weight 131 slidably supported in vertical guides 133, properly braced within said cab 23. The counter-weights are somewhat lighter than the effective weight of the hinged portions.

The brush or broom control wheel 71 is adapted to be manipulated by a driver positioned in an adjacent seat 73. An emergency brake lever 75 is here also provided for the operator. The front and rear emergency levers 21 and 75, respectively, are adapted to operate the same conventional emergency brake system. This is done through and by means of a suitable linkage. A rear controller 77 is also provided near the seat 73 and has an analogous start, a stop, and off position similar to those of the controller 17. This controller 77 provides means whereby the operator seated in the rear seat 73 may control the motions of the vehicle in the manner that he does from the front seat by means of controller 17, except that the controllers are each one particularly designed to provide the most advantageous driving speeds for the respective direction in which the vehicle is to be driven.

An accelerator pedal 79, operable like the pedal 11 to vary the output of the engine E by varying the fuel supply, is also positioned near the seat 73. A foot pedal 81 for controlling service action of the air brakes is also similarly positioned. It is evident that an operator in the seat 73 may control the accelerations and decelerations of the vehicle as well as from the front seat 13. In order that he may also be able to control the steering thereof, a steering wheel 83 is provided behind the seat 73 (in front of the operator when seated). This wheel 83 is connected with a steering gear 85. The gear 85 is linked to a conventional drag link 87 (Fig. 3) by means of the second drag link 89 and a rocker arm mechanism 91. The drag link 87 is placed on the opposite side of the truck, that is, with respect to the positioning of the conventional steering gear 19 and drag link 20 connected therewith. The result of this construction is that an operator seated in the seat 73 may turn the vehicle toward the right (when operating in reverse) by turning the wheel 83 to the right and vice versa. In other words the truck may be independently steered from either one of the seats 13 or 73. The steering mechanisms may be of the reversible type so that each one operates to reverse the other, but in the present embodiment, when one wheel is used for steering, then the drag link for the other is uncoupled. For instance, when the wheel 83 is used for steering then the drag link 20 is uncoupled, and when the wheel 19 is used, then the link 87 is uncoupled.

The operator for the seat 73 is provided with two other controls. One of them comprises a controller 93 for the broom motor 49. This controller provides means for starting and stopping and varying the speed of the motor 49, and consequently of the broom 35.

The last control device for the operator in the seat 73 comprises a hand wheel 95 for controlling a plough pull-out mechanism. The hand wheel 95 is fastened to a vertically rotatable spindle 96 for winding and unwinding a plough control chain 97. The chain 97 passes outwardly to and through a pulley block 99 and thence to the outer end of a plough blade 101. The blade 101 is fastened to a hinging bracket 103 which is rotatably and slidably held on a rod 105 depending from the cab 23. The rod 105 is braced by a member 106. It is evident that the angular position of the plough blade 101 may be adjusted with respect to the chassis by winding and unwinding the chain 97 on the spindle of wheel 95. When the chain 97 is unwound the blade 101 is forced up against the truck by means of the reaction of snow or like material which is being cleared. In order to hold a given adjustment, a pawl 98 acting on a suitable ratchet is used for preventing reversal of the shaft 96 under a reaction due to ploughing.

In order to adjust the elevation of the blade 101, its bracket 103 is made vertically slidable on the shaft 105. Its downward movement is limited by proper stops on said shaft such as the end of the member 106 and/or pins passed through the shaft. Suitable means 107 are provided for raising and lowering said plough. These will not be described in detail inasmuch as the invention per se is directed more particularly to other matters.

A pair of headlight brackets are provided at the front of the truck and a similar pair of headlight brackets at the rear, on which are mounted headlights when operation takes place at night. The operation of the sweeper is as follows:

For instance, in order to clear a snow blocked road the driver positions himself in the seat 73 after having started the engine E and uncoupled the drag link 20. He may start the engine from the seat 73 or seat 13, if a self-starter is provided. The controller 77 is preferably set in its "off" position, as well as the controller 17. The controller 93 is then set to cause the broom or sweeper motor 49 to revolve, thereby rotating the broom 35. The broom is permitted to drop to the roadway by manipulating the wheels 71 to unwind the chain 61 and by releasing the pawl 62. The plough blade 101 may be adjusted to any desired angular position and to either vertical position from the wheel 95 and the handle 115 respectively. Its pawl 98 is accordingly manipulated. The controller 77 may now be set for movement of the vehicle in the direction of the broom 35. The emergency brake is released and the accelerator pedal 79 manipulated to give the desired speed. Steering may be accomplished from the wheel 83. Service and emergency braking may be accomplished from the pedal 81 and the lever 75 respectively. Snow and the like is projected from the broom 35 outwardly to the right, said broom rotating clockwise (Figs. 1 and 5). A guard 84 may be positioned over the broom to prevent snow and the like from being projected around and on to the glass of the windows or shields 25, or from being thrown too far from the roadway.

When the required amount of road or the like has been cleaned, the controller 93 is put into "off" position whereupon the broom ceases rotation. The vehicle is brought to rest from the controller 77, and said broom and the plow are raised and/or folded into their rest positions. The operator may then mount the cab 5 and drive the vehicle in the opposite direction, directly away from its cleaning work, without turning it about. He of course re-couples the link 20 and uncouples the link 87. This reverse action is advantageous where deep snow is had and it is difficult to turn about in the relatively narrow track swept out by the sweeper itself. This sweeper operates in the described fashion with ease, whereby the work is expedited.

The use of a hinged frame construction, articulated in the manner described, supported by the caster 119 and counter-weighted in the manner set forth, results in the brush frame being automatically raised and lowered as high places and depressions are traversed in the roadway. It is to be understood that the proportioning of the parts and lost movement between the same is made such as to permit of proper driving of the brush 35, regardless of its various adjusted positions. The last-named statement is made more particularly with regard to the bearings 43, slots 41 and the chain drive 53. The bearings 43 are loose enough or have relative angular movement enough to permit the swinging of the brush frame 34 on the axis through pins 32.

When a grade is approached, brush first, the caster 119 takes care of the required elevation of the outer end of the frame and when the rear wheels of the truck reach the beginning of the grade, then they take care of the elevation of the inner end of the frame. The high degree of articulation or flexibility is thus attained. All hollows and hummocks of the road are well cleaned.

It is to be understood that the cab 23, the framework 31 and the sweeper elements associated with these parts, may be removed as a unit from the chassis 1 by merely uncoupling a few connections. The sweeper parts are mounted on and in the cab 23. Hence during the summer season the chassis 1 (with its cab 5) may be used for other purposes while the sweeping elements are stored away.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A sweeper comprising a vehicle including a framework, a brush frame hinged to said framework on a substantially horizontal axis, means for supporting the outer end of said brush frame on a roadway, means for independently counterbalancing a substantial proportion of the brush frame weight, a brush adjustably suspended in said brush frame and said framework, one end thereof being loosely guided in the outer end of said brush frame and the other end loosely guided in said framework and means for causing rotation of the suspended brush, said last-named means being mounted on the brush frame.

2. A sweeper comprising a vehicle including a framework, a brush frame hinged to said framework on a substantially horizontal axis, means for supporting said brush frame on the road, a brush movably mounted in said brush frame, and means for supporting said brush independently of such brush frame whereby said brush is adapted to follow the contour of the roadway.

3. A sweeper comprising a vehicle including a removable framework, a brush frame hinged to said framework on a substantially horizontal axis, means for supporting said brush frame on the road comprising a rolling element, a brush movably mounted in said brush frame and means for suspending said brush independently of such brush frame whereby said brush is adapted to follow the contour of the roadway, and means for counterbalancing a substantial portion of the brush frame weight independently of said brush.

4. A sweeper comprising a vehicle including a framework, a brush frame hinged to said framework on a substantially horizontal axis, means for supporting said brush frame on the road comprising a rolling element, a brush adjustably suspended in said brush frame and framework, having one end loosely and slidably supported in said brush frame and the other end loosely and slidably supported in said framework.

5. A sweeper comprising a vehicle including a framework, a brush frame hinged to said framework on a substantially horizontal axis, means for supporting said brush frame on the road comprising a rolling element, a brush adjustably suspended in said brush frame and framework, having one end loosely and slidably supported in said brush frame and the other end loosely and slidably supported in said framework, and means for rotating the brush, said brush frame being adapted to hold said brush in a position so that it may be rotated.

6. A sweeper comprising a vehicle including a removable framework, a brush frame hinged to said framework on a substantially horizontal axis, means for supporting said brush frame on the road comprising a rolling element, a brush, means for movably and loosely mounting the brush in said brush frame, means for suspending said brush independently of the brush frame, whereby said brush is movable with respect to the brush frame and adapted to follow the contour of the roadway independently of the movement of the brush frame.

In testimony whereof, I have signed my name to this specification this 14th day of March, 1927.

CARL McKINNEY.